US010137926B2

(12) United States Patent
Strobel (10) Patent No.: US 10,137,926 B2
(45) Date of Patent: Nov. 27, 2018

(54) STEERING SHAFT FOR A MOTOR VEHICLE STEERING SYSTEM (71) Applicants: ThyssenKrupp Presta AG, Eschen (LI); ThyssenKrupp AG, Essen (DE)

(72) Inventor: Joseph Léon Strobel, Mauren (LI)

(73) Assignees: THYSSENKRUPP PRESTA AG, Eschen (LI); THYSSENKRUPP AG, Essen (DE)

(*) Notice: Subject to any disclaimer, the term of this patent is extended or adjusted under 35 U.S.C. 154(b) by 48 days.

(21) Appl. No.: 15/122,604

(22) PCT Filed: Feb. 25, 2015

(86) PCT No.: PCT/EP2015/053955
§ 371 (c)(1),
(2) Date: Aug. 30, 2016

(87) PCT Pub. No.: WO2015/132106
PCT Pub. Date: Sep. 11, 2015

(65) Prior Publication Data
US 2017/0072988 A1 Mar. 16, 2017

(30) Foreign Application Priority Data
Mar. 4, 2014 (DE) .......... 10 2014 102 807

(51) Int. Cl.
B62D 5/08 (2006.01)
B62D 1/20 (2006.01)
(Continued)

(52) U.S. Cl.
CPC ............ B62D 1/20 (2013.01); B62D 5/0409 (2013.01); B62D 5/083 (2013.01); B62D 6/10 (2013.01); F16D 3/10 (2013.01); B62D 5/18 (2013.01)

(58) Field of Classification Search
CPC ........ B62D 1/20; B62D 5/0409; B62D 5/083; B62D 5/18; B62D 6/10; F16D 3/10
(Continued)

(56) References Cited

U.S. PATENT DOCUMENTS 4,127,080 A * 11/1978 Lakiza ................ B63H 23/34
464/97 X
5,390,755 A * 2/1995 Joerg ..................... B62D 5/083
(Continued)

FOREIGN PATENT DOCUMENTS

CN 1174536 A 2/1998
CN 2725145 Y 9/2005
(Continued)

OTHER PUBLICATIONS

International Search Report for PCT/EP2015/053955 dated May 21, 2015 (mailed May 29, 2015).
(Continued)

Primary Examiner — Greg Binda
(74) Attorney, Agent, or Firm — thyssenkrupp North America, Inc.

(57) ABSTRACT

A steering shaft for a motor vehicle steering system may be used in connection with a variety of power assistance mechanisms. The steering shaft may comprise a first shaft part and a second shaft part that are rotationally-elastically coupled by way of a torsion bar. In order to transmit torque, the torsion bar may be received in a bore of the first shaft part and coupled to both the first and second shaft parts. In many cases, a first end of the torsion bar is coupled to the first shaft part, and a second end of the torsion bar is coupled to the second shaft part. The torsion bar may be mounted in the bore such that it can be rotated with respect to the first shaft part via a bearing element. In some examples, the bearing element comprises a prestressing element.

10 Claims, 4 Drawing Sheets (51) Int. Cl.
*B62D 5/083* (2006.01)
*B62D 6/10* (2006.01)
*B62D 5/04* (2006.01)
*F16D 3/10* (2006.01)
*B62D 5/18* (2006.01)

(58) Field of Classification Search
USPC .............................................. 464/97; 180/444
See application file for complete search history.

(56) References Cited

U.S. PATENT DOCUMENTS

| | | | |
|---|---|---|---|
| 5,727,443 A | 3/1998 | Baxter et al. | |
| 5,878,832 A * | 3/1999 | Olgren | B62D 6/10 180/444 |
| 6,250,334 B1 * | 6/2001 | Abraham | B62D 5/083 |
| 6,296,018 B1 * | 10/2001 | Place | B62D 5/083 |
| 2004/0238264 A1 | 12/2004 | Zernickel et al. | |
| 2017/0072988 A1 * | 3/2017 | Strobel | B62D 5/083 |

FOREIGN PATENT DOCUMENTS

| | | |
|---|---|---|
| CN | 202038363 U | 11/2011 |
| DE | 19937282 A1 | 2/2001 |
| DE | 10003738 A1 | 8/2001 |
| DE | 10010837 A1 | 9/2001 |
| DE | 102010039125 A1 | 2/2012 |
| DE | 102013219883 A1 | 4/2015 |
| FR | 2642719 A1 | 8/1990 |
| JP | S59106368 A | 6/1984 |

OTHER PUBLICATIONS

English Language Abstract for DE10010837A1.
English language Abstract for DE 10003738 A1.
English language Abstract for CN 202038363 U.
English language Abstract for CN 2725145 Y.
English language Abstract for FR 2642719 A1.
English language Abstract for JP S59106368 A.

* cited by examiner

STEERING SHAFT FOR A MOTOR VEHICLE STEERING SYSTEM

CROSS REFERENCE TO RELATED APPLICATIONS

This application is a U.S. National Stage Entry of International Patent Application Serial Number PCT/EP2015/053955, filed Feb. 25, 2015, which claims priority to German Patent Application No. 10 2014 102 807.4 filed Mar. 4, 2014, the entire contents of both of which are incorporated herein by reference.

FIELD

The present disclosure relates to steering shafts that can be used primarily in motor vehicles.

BACKGROUND

In the field of steering shafts for motor vehicle steering systems, it is known to determine a torque which is input via an input shaft relative to an output shaft. The torque which is determined in this way can represent the basis for the determination of an assistance torque which is to be introduced into the steering system or an assistance force of a power assistance means for steering assistance of the driver. To this end, it is known to divide the steering shaft of the motor vehicle into an input shaft and an output shaft, the input shaft usually being connected to the steering wheel of the motor vehicle, via which a driver inputs the corresponding steering torque or the corresponding steering command into the input shaft. The output shaft is usually connected directly or indirectly to the steering pinion which, via a corresponding rack and track rods, transmits the steering movement to the steered wheels of the motor vehicle.

Power assistance means, for example electric power assistance means or hydraulic power assistance means, are usually attached to the output shaft, to the steering pinion or to the rack in order to input the corresponding assistance torques. Here, the respective power assistance means is actuated via the determination of the torque with regard to the output shaft, which torque is input into the input shaft by the driver via the steering wheel.

It is known here to connect the input shaft and the output shaft of a steering shaft by means of a torsion bar which is also called a torsion rod, and to determine the input torque from the relative rotary angle between the input shaft and the output shaft via a torque sensor. In the case of a hydraulic power steering system, this can take place, for example, via a rotary slide valve and, in the case of an electromechanical power steering system, this can take place, for example, via corresponding magnetic sensors.

Steering shafts for electromechanical power assistance means are used to measure the input torque. During the input of a steering movement via a steering wheel of the motor vehicle by way of the respective driver, a torque is input into the steering shaft, and, in particular, into an input shaft, in order finally to swivel the wheels of the motor vehicle. Here, the torsion bar which is arranged between the input shaft and the output shaft serves to transmit the input torque from the input shaft to the output shaft, said torsion bar being twisted by a defined amount which corresponds to the torque which is input via the input shaft, with the result that relative twisting between the input shaft and the output shaft is achieved. The power assistance means can be actuated accordingly from said relative twisting between the input shaft and the output shaft, which relative twisting can be sensed by way of the sensor.

Since the torsion bar is fixed both in the input shaft and in the output shaft, relative twisting accordingly takes place between the input shaft and the torsion bar and between the output shaft and the torsion bar. The twisting between the input shaft and the torsion bar is based on the fact that the torsion bar is held in a rotationally fixed manner in a bore at one end of the bore of the input shaft, and then extends through the bore toward the output shaft. Relative twisting between the torsion bar and the wall of the bore of the input shaft which lies opposite it accordingly takes place at the transition to the output shaft.

In order to prevent overloading of the torsion bar, the input shaft and the output shaft can be connected or coupled to one another via a loose positively locking connection, in such a way that direct positively locking engagement of the input shaft with the output shaft occurs if a maximum value for the elastic twisting of the torsion bar is exceeded.

In order to prevent oblique positions between the input shaft and the torsion bar, a bearing element is provided in the bore, by means of which bearing element the torsion bar is mounted with respect to the first shaft part. The torsion bar is usually mounted via a needle bearing or a sliding bush as bearing system in the bore of the output shaft. In order to prevent a falsification of the torque measurement here and at the same time to minimize noise formation which can occur, for example, by way of an existing bearing play, high tolerance requirements exist for said bearing elements.

DE 100 10 837 A1 has disclosed a rotary slide with a torsion bar fastening means without machining with the removal of material, in which a torsion slide which has a central axial bore with a wall and a torsion bar which is arranged coaxially in the bore are provided, and a needle bearing being provided between the torsion bar and the wall of the coaxial bore.

DETAILED DESCRIPTION

Although certain example methods and apparatus have been described herein, the scope of coverage of this patent is not limited thereto. On the contrary, this patent covers all methods, apparatus, and articles of manufacture fairly falling within the scope of the appended claims either literally or under the doctrine of equivalents. Moreover, those having ordinary skill in the art will understand that reciting 'a' element or 'an' element in the appended claims does not restrict those claims to articles, apparatuses, systems, methods, or the like having only one of that element.

The present disclosure generally concerns steering shafts that can be used primarily for motor vehicle steering systems. The steering shaft may in some examples comprise comprising at least one first shaft part with a bore, in which, in order to transmit a torque, a torsion bar is received for rotationally elastic coupling of the first shaft part to a second shaft part. The steering shaft may be provided for use with a steering system with power assistance. Moreover, one example object of the present disclosure concerns a steering shaft for a motor vehicle steering system that reduces the requirements for component accuracy and reduces noise.

Accordingly, a steering shaft for a motor vehicle steering system is proposed, comprising a first shaft part with a bore, in which, in order to transmit a torque, a torsion bar is provided for rotationally elastic coupling of the first shaft part to a second shaft part, the torsion bar being mounted in the bore such that it can be rotated with respect to the first shaft part via a bearing element. According to the invention, the bearing element comprises a prestressing element.

By virtue of the fact that the bearing element comprises a prestressing element, it is possible, in the case of reduced tolerance requirements, nevertheless to provide a reduction in noise from the mounting of the torsion bar in the bore of the first shaft part, since a bearing play of the bearing is reduced on account of the prestress.

Accordingly, a prestressing element or a spring element is arranged between an inner circumferential face of the first shaft part and/or of the second shaft part and an outer circumferential face of the torsion bar, the prestressing element or the spring element being supported directly or indirectly on the inner circumferential face and on the outer circumferential face in such a way that the inner circumferential face is prestressed coaxially with respect to the outer circumferential face.

In this way, the torsion bar can be mounted substantially without play even in the case of relatively great tolerances in the outer circumferential face and/or the inner circumferential face and the resulting bearing plays, and the emission of noise can be reduced.

The prestressing element is preferably provided in order to apply radial prestressing force, in order to radially prestress the torsion bar relative to the bore of the first shaft part. Here, the torsion bar is particularly preferably radially prestressed via the prestressing element in such a way that it is prestressed coaxially with respect to the first shaft part.

The prestressing element is preferably configured as an anti-friction bearing inner ring and/or as an anti-friction bearing outer ring of a radially prestressed anti-friction bearing with at least one rolling body. In a further preferred embodiment, the bearing element is a radially prestressed anti-friction bearing, preferably a radially prestressed needle bearing. Here, the prestress is configured with respect to the corresponding shaft sections which are either themselves part of the bearing or support elements of the bearing.

In one preferred embodiment, the bearing element is configured by way of the prestressing element itself. The prestressing element is particularly preferably configured as a prestressed sliding bush or plain bearing, preferably as a tapered sliding bush which applies a radial prestress. Here, the bush can also be configured in an undulating shape as viewed in longitudinal section and can accordingly have a plurality of tapered portions. In this way, a radially prestressed bearing system can be achieved in a particularly simple way, for example by way of a simple sheet metal part, which bearing system leads to reduced tolerance requirements of the bearing regions of the first and/or second shaft part and of the torsion bar. In order to improve the tribological properties, the sliding bush can comprise a surface coating, such as polytetrafluoroethylene (PTFE).

In a further preferred embodiment, the prestressing element can be configured as an elastic plastic sleeve which then provides the radial prestress. In this way, a bearing element can be manufactured particularly economically.

In one development, in the case of the use of an anti-friction bearing, a rolling body can also be configured as a prestressing element, for example in the form of an elastic rolling body or a hollow, thin-walled steel cylinder.

In one preferred refinement, the first shaft part is an output shaft which is coupled via the torsion rod to a second shaft part which is configured as an input shaft.

In order to avoid destruction of the torsion bar if excessively high torques are input, the first shaft part is preferably additionally connected to the second shaft part via a loose positively locking connection.

Figure 1:
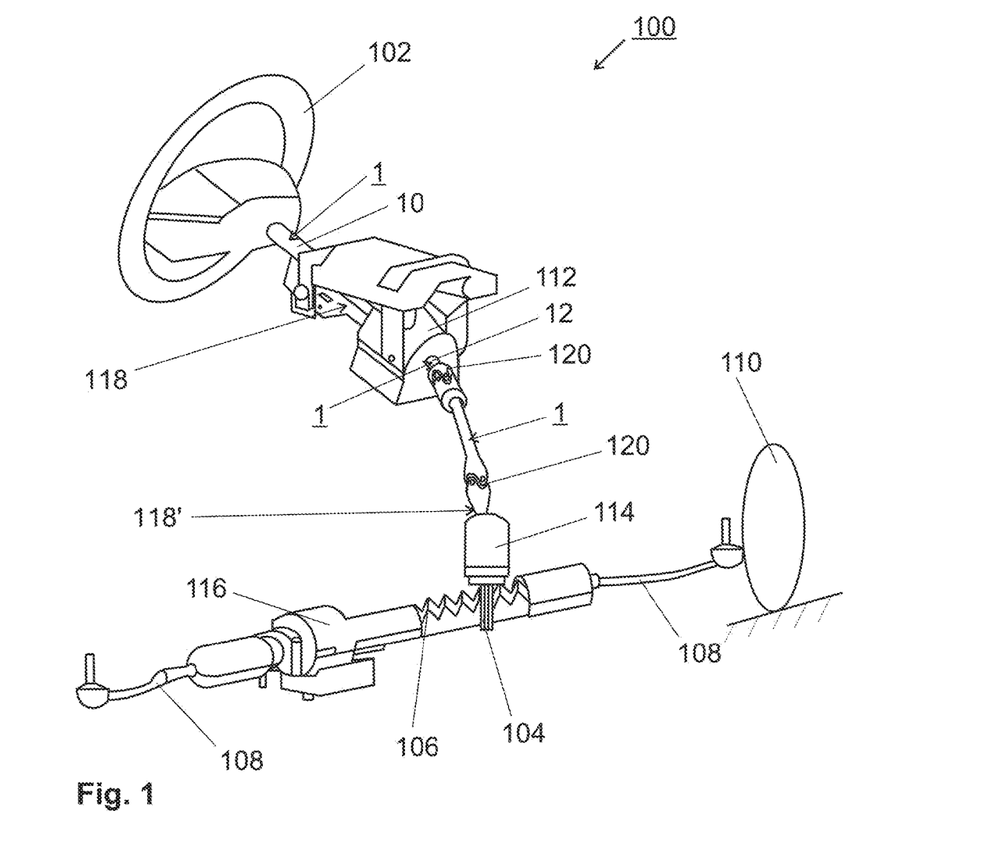
FIG. 1 is a diagrammatic view of an example motor vehicle steering system including an example power assistance means.

FIG. 1 shows a diagrammatic illustration of a motor vehicle steering system 100, it being possible for a driver to input a corresponding torque as steering command into a steering shaft 1 via a steering wheel 102. The torque is then transmitted via the steering shaft 1 to a steering pinion 104 which meshes with a rack 106 which then for its part transmits the predefined steering angle via corresponding track rods 108 to the steerable wheels 110 of the motor vehicle.

An electric and/or hydraulic power assistance means can be provided in the form of the power assistance means 112 which is coupled to the steering shaft 1, the power assistance means 114 which is coupled to the pinion 104, and/or the power assistance means 116 which is coupled to the rack 106. The respective power assistance means 112, 114 or 116 inputs an assistance torque into the steering shaft 1, the steering pinion 104 and/or an assistance force into the rack 106, as a result of which the driver is assisted during the steering work. The three different power assistance means 112, 114 and 116 which are shown in FIG. 1 show possible positions for their arrangement.

Only a single one of the shown positions is usually occupied by a power assistance means. The assistance torque or the assistance force which is to be applied by means of the respective power assistance means 112, 114 or 116 in order to assist the driver is defined with consideration of an input torque which is determined by a torque sensor 118. As an alternative to or in combination with the input of the assistance torque or the assistance force, an additional steering angle can be input into the steering system by way of the power assistance means 112, 114, 116, which additional steering angle is added to the steering angle which is applied by the driver via the steering wheel 102.

The steering shaft 1 has an input shaft 10 which is connected to the steering wheel 102 and an output shaft 12 which is connected to the rack 106 via the steering pinion 104. The input shaft 10 and the output shaft 12 are coupled to one another in a rotationally elastic manner via a torsion rod which cannot be seen in FIG. 1. In this way, a torque which is input by a driver via the steering wheel 102 into the input shaft 10 always leads to a relative rotation of the input shaft 10 with regard to the output shaft 12 when the output shaft 12 does not rotate exactly synchronously with respect to the input shaft 10. This relative rotation between the input shaft 10 and the output shaft 12 can be measured, for example, via a rotary angle sensor and can accordingly be determined into a corresponding input torque relative to the output shaft on the basis of the known torsional rigidity of the torsion bar. In this way, the torque sensor 118 is configured by way of the determination of the relative rotation between the input shaft 10 and the output shaft 12. A torque sensor 118 of this type is known in principle and can be realized, for example, in the form of a rotary slide valve, an electromagnetic measurement, or another measurement of the relative twisting.

Accordingly, a torque which is applied by the driver via the steering wheel 102 to the steering shaft 1 or the input shaft 10 will cause the input of an assistance torque by way of one of the power assistance means 112, 114, 116 only when the output shaft 12 is twisted relative to the input shaft 10 counter to the rotational resistance of the torsion bar.

As an alternative, the torque sensor 118 can also be arranged at the position 118', the division of the steering shaft 1 into the input shaft 10 and the output shaft 12 and the rotationally elastic coupling via the torsion bar correspondingly then being present at a different position, in order for it to be possible to determine a relative rotation and therefore accordingly an input torque and/or an assistance force to be input from the relative twisting of the output shaft 12 which is coupled to the input shaft 10 via the torsion bar.

Furthermore, the steering shaft 1 in FIG. 1 comprises at least one cardan joint 120, by means of which the course of the steering shaft 1 in the motor vehicle can be adapted to the spatial conditions.

The exemplary embodiments of the steering shaft 1 which are shown in the following text in FIGS. 2 to 10 and 11 can be combined particularly satisfactorily with the arrangement (shown in FIG. 1) of the torque sensor 118 in conjunction with the power assistance means 112 which is coupled to the steering shaft 1.

Figure 11:
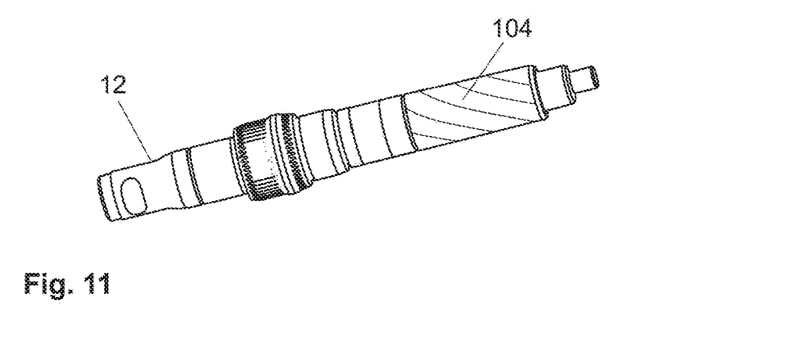
FIG. 11 is a diagrammatic perspective view of an example steering shaft including an example steering pinion.

The embodiment of the steering shaft 1 which is shown in FIG. 11 can be used particularly satisfactorily together with the arrangement of the torque sensor 118' in conjunction with the power assistance means 114 which is coupled to the pinion 104 or the power assistance means 116 which is coupled to the rack 106.

Figure 2:
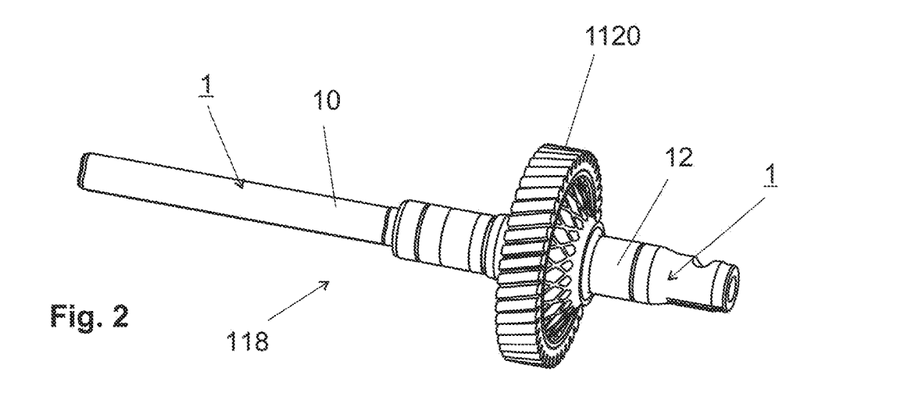
FIG. 2 is a diagrammatic perspective view of an example steering shaft having an example first shaft part and an example second shaft part.

FIG. 2 diagrammatically shows a steering shaft 1 having an output shaft 12 which is configured as a first shaft part and an input shaft 10 which is configured as a second shaft part, the region where the input shaft 10 and the output shaft 12 meet being bridged by the torque sensor 118 which is shown in FIG. 1. The input shaft 10 is arranged coaxially with regard to the output shaft 12 and is connected to the latter in a rotationally elastic manner via a torsion rod which cannot be seen in FIG. 2 but rather runs internally, the specific construction of the steering shaft 1 being clarified in FIGS. 3 to 5.

A worm gearwheel 1120 is provided fixedly on the output shaft 12 so as to rotate with it in order to input the assistance torque by way of the power assistance means 112. Accordingly, an output of an electric motor or servomotor of the power assistance means 112 can act on the worm gearwheel 1120. In one alternative, a hydraulic drive can also be provided. The power assistance means 112 therefore serves to input the assistance torque which is determined via the torque sensor 118 for steering assistance of the driver into the output shaft 12 and therefore into all components of the motor vehicle steering system 100 which lie downstream of the output shaft 12.

In order for it to be possible to accurately determine the torque or the magnitude of the assistance force which is to be input via the worm gearwheel 1120, the input shaft 10 and the output shaft 12 are connected to one another in a rotationally elastic manner, as has already been described above, with the result that the respective steering command which is input by the driver via the steering wheel 102 into the input shaft 10 results in the assistance of the driver by way of the power assistance means 112 which acts on the worm gearwheel 1120 and therefore on the steering shaft 1. To this end, the torque sensor 118 is provided which determines the relative rotation between the input shaft 10 and the output shaft 12 or the corresponding relative rotary angle between the input shaft 10 and the output shaft 12, and the assistance torque which is to be provided by the power assistance means 112 can be determined on this basis.

Figure 3:
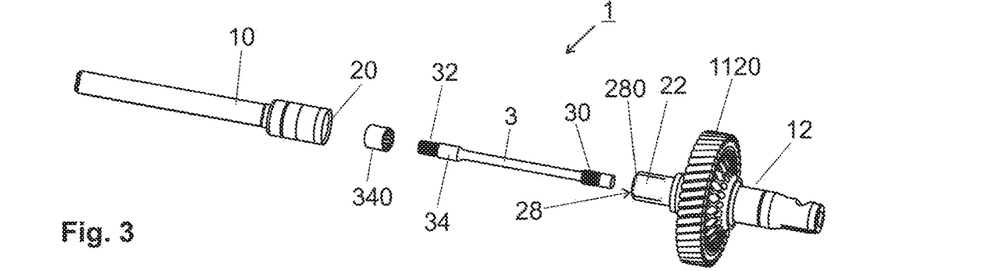
FIG. 3 is a diagrammatic perspective exploded view of the example steering shaft of FIG. 2.

FIG. 3 shows a diagrammatic exploded illustration of the steering shaft 1, the input shaft 10 and the output shaft 12 being shown together with the worm gearwheel 1120.

The input shaft 10 has a receiving region 20 which serves to receive an inserting region 22 of the output shaft 12, which inserting region 22 is complementary with respect to said receiving region 20. This can be seen again particularly clearly in the sectional illustration of FIG. 5, the inserting region 22 of the output shaft 12 being received in the receiving region 20 of the input shaft 10 in such a way that the input shaft 10 can in principle rotate freely with respect to the output shaft 12, but at the same time is guided in the radial direction. There is a small play between the receiving region 20 and the inserting region 22, in order to achieve substantially friction-free rotatability.

A torsion rod 3 connects the input shaft 10 to the output shaft 12 in a rotationally elastic manner. Said rotationally elastic connection of the input shaft 10 to the output shaft 12 is shown diagrammatically in FIG. 5 in a sectional illustration. To this end, the torsion rod 3 has a joining section 30 at its end which faces the output shaft 12 and a joining section 32 at its end which faces the input shaft 10. That joining section 30 of the torsion bar 3 which faces the output shaft 12 is connected fixedly to the output shaft 12 so as to rotate with it in a joining socket 40 of the output shaft 12. That joining section 32 of the torsion bar 3 which faces the input shaft 10 is connected fixedly to the input shaft 10 so as to rotate with it in a joining socket 42 of the input shaft 10.

Figure 5:
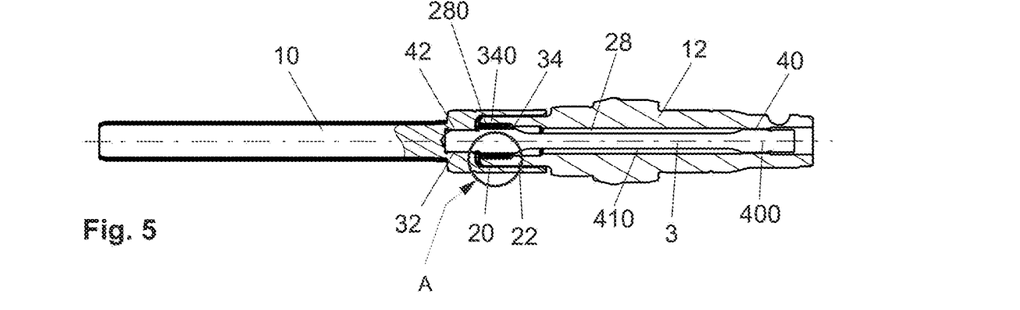
FIG. 5 is a diagrammatic cross-sectional view taken across sections of the example steering shaft of FIGS. 2 to 4 in an assembled state.

Here, the torsion bar 3 is received in a bore 28 in the output shaft 12 and extends from the joining socket 40 of the output shaft 12 through the bore 28 and through its open end 280 in the direction of the joining socket 42 of the input shaft 10.

In the embodiment which is shown, the torsion bar 3 has a bearing region 34 with a bearing seat 36, on which a bearing element 340 can be held in such a way that, as arises, for example, from FIG. 5, the torsion rod 3 which is held fixedly on the output shaft 12 so as to rotate with it at the joining section 30 can be twisted freely relative to the output shaft 12 in the bore 28 of the output shaft 12.

Here, the torsion bar 3 is held by way of the bearing element 340 substantially coaxially with respect to the input shaft 10 and the output shaft 12. Here, a possible oblique position between the input shaft 10 and the output shaft 12 is avoided.

Figure 4:
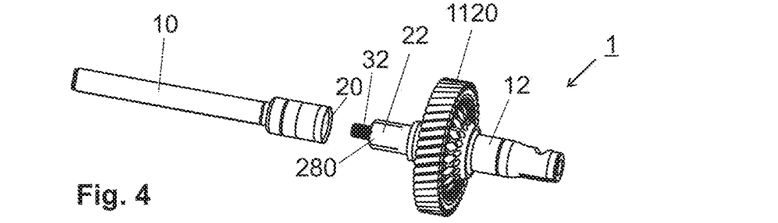
FIG. 4 is a diagrammatic perspective view of the example steering shaft of FIGS. 2 and 3 in an intermediate assembled state.

FIG. 4 diagrammatically shows an assembly state of the steering shaft 1, in which the torsion bar 3 has already been inserted into the bore 28 of the output shaft 12 and the joining section 30 of the torsion bar 3 is connected in a non-positive and positively locking manner to the joining socket 40 of the output shaft 12. Accordingly, merely the other joining section 32 of the torsion bar 3 still protrudes out of the output shaft 12, with the result that the inserting region 22 of the output shaft 12 can be introduced in a subsequent assembly step into the corresponding receiving region 20 of the input shaft 10, as a result of which the joining section 32 of the torsion bar 3 is pressed into the corresponding joining socket 42 of the input shaft 10.

In order to prevent overloading of the torsion bar 3 or the connection of the torsion bar 3 to the input shaft 10 and/or the output shaft 12 when a high torque is input by means of the steering wheel, the input shaft 10 and the output shaft 12 are additionally preferably connected to one another via a loose positively locking connection for rotationally elastic connection via the torsion bar 3, in such a way that a maximum value for the relative rotation of the input shaft 10 relative to the output shaft 12 and therefore also a maximum value for the twisting of the torsion bar 3 are predefined.

Accordingly, it has to be ensured during the assembly which is shown in FIG. 4 that the torsion bar 3 is joined in the middle position of the loose positively locking connection with regard to the corresponding maximum rotary angle.

In FIG. 5, a bearing element 340 is shown diagrammatically in the circular detail at the designation A, which bearing element 340 is arranged in the bearing region 34 of the torsion bar 3, and which bearing element 340 is arranged between the bearing seat 36 in the bearing region 34 of the torsion bar 3 and a bearing seat 26 of the output shaft 12. The bearing seat 26 is provided on the inner circumferential face of the bore 28 in the output shaft 12. In the exemplary embodiment which is shown, the bearing seat 26 is provided within the bore 28 in the immediate vicinity of the open end 280 of the output shaft 12.

The bearing element 340 is provided in the bearing region 34 of the torsion bar 3, in order to hold the torsion bar 3 in the bore 28 substantially coaxially with respect to the output shaft 12 and accordingly to avoid an oblique position between the input shaft 10, the output shaft 12 and the torsion bar 3, in order to minimize any possible falsification of the torque measurement and/or possible noise formation.

In the exemplary embodiments, the bearing element 340 comprises a prestressing element which can build up a radial prestressing force between the output shaft 12 and the torsion bar 3 and in this way can hold the torsion bar 3 coaxially with respect to the output shaft 12.

FIGS. 6 to 10 show different refinements of the bearing element 340 which comprises the prestressing element.

Figure 6:
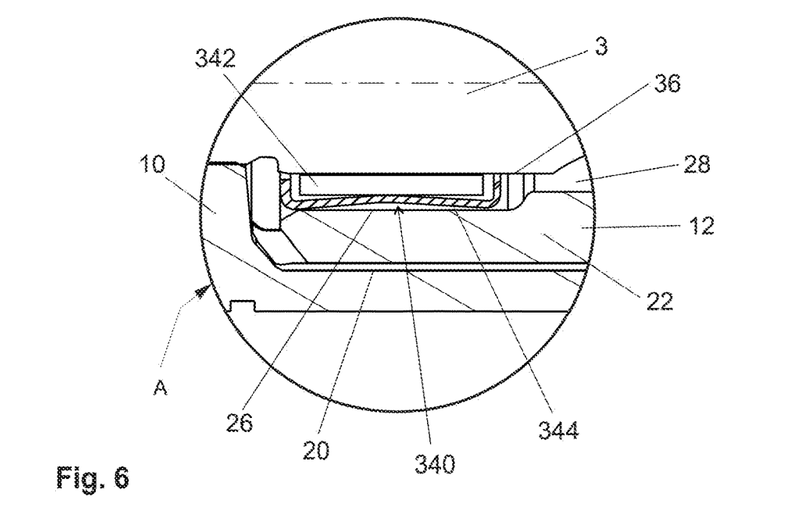
FIG. 6 is a diagrammatic cross-sectional view of an example bearing element taken across a bearing region.

FIG. 6 shows that detail from FIG. 5 which is denoted by the designation A in a first exemplary embodiment.

In said exemplary embodiment, the bearing element 340 comprises rolling bodies 342 which are arranged around the circumference and are held in a resilient anti-friction bearing ring 344 which forms the prestressing element. The anti-friction bearing ring 344 is supported directly on the bearing seat 26 of the output shaft 12. The rolling bodies 342 roll directly on the bearing seat 36 of the torsion bar 3. Therefore, the output shaft 12 and the torsion bar 3 are prestressed against one another via the anti-friction bearing ring 344 which is configured as a prestressing element, the anti-friction bearing ring 344 exerting a radial prestress on the rolling bodies 342. The prestressing element in the form of the anti-friction bearing ring 344 acts in a correspondingly indirect manner, namely via the rolling bodies 342, on the torsion bar 3. The anti-friction bearing ring 344 is configured here as an anti-friction bearing outer ring.

The anti-friction bearing ring 344 which is configured as a prestressing element is preferably configured in the form of a sheet metal part, for example in the form of a sheet metal sleeve ring which is constricted in its middle region. Here, the thickness of the sheet metal is configured in such a way that the anti-friction bearing ring 344 has elastic properties and can accordingly exert a prestress.

The rolling bodies 342 can consist of plastic or can be configured as steel bodies, in particular in the configuration of a radially prestressed needle bearing. In one development, the rolling bodies can also be of elastic configuration, for example as thin, hollow steel rollers.

In the embodiment which is shown, the anti-friction bearing 344 has a tapered shape and correspondingly forms a resilient part which prestresses the rolling bodies 342 against the bearing seat 36 of the torsion bar 3.

On account of the bearing element 340 which has the prestressing element in the form of the anti-friction bearing ring 344, the anti-friction bearings 342 are capable of always following the outer contours of the bearing seat 36 of the torsion bar 3. Accordingly, the tolerance requirements for the bearing seat 36 and the tolerance requirements for the bearing seat 26 can be reduced in comparison with the use of a conventional anti-friction bearing or needle bearing, the rattling inclination or the inclination to emit noise also being reduced at the same time.

Figure 7:
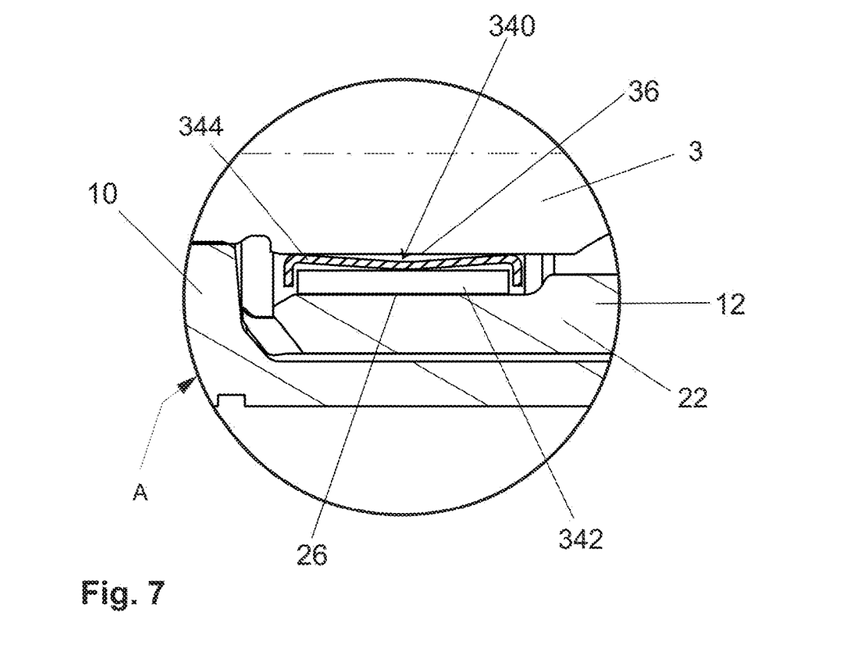
FIG. 7 is a diagrammatic sectional view of another example bearing element taken across a bearing region.

In a further exemplary embodiment which is shown in FIG. 7, the bearing element 340 is produced by way of rolling bodies 342 and a prestressing element in the form of an anti-friction bearing ring 344. Here, the anti-friction bearing ring 344 is supported on the bearing seat 36 of the torsion bar 3, and the rolling bodies 342 roll on the bearing seat 26, with the result that a radial prestress is again configured here between the bearing seat 26 of the output shaft 12 and the bearing seat 36 of the torsion bar 3, which radial prestress ensures that the torsion bar 3 is held coaxially with respect to the output shaft 12. The anti-friction bearing ring 344 is configured here as an anti-friction bearing inner ring.

Furthermore, the rolling bodies 342 can follow the contours of the bearing seat 26 in an improved manner as a result of the applied prestress, with the result that a rattling inclination can be reduced further even in the case of reduced tolerance requirements.

The anti-friction bearing ring 344 is of tapered configuration, with the result that it exerts a prestress on the rolling bodies 342 in the radial direction and accordingly prestresses the rolling bodies 342 onto the bearing seat 26 of the output shaft 12 and the bearing seat 36 of the torsion bar 3.

Figure 8:
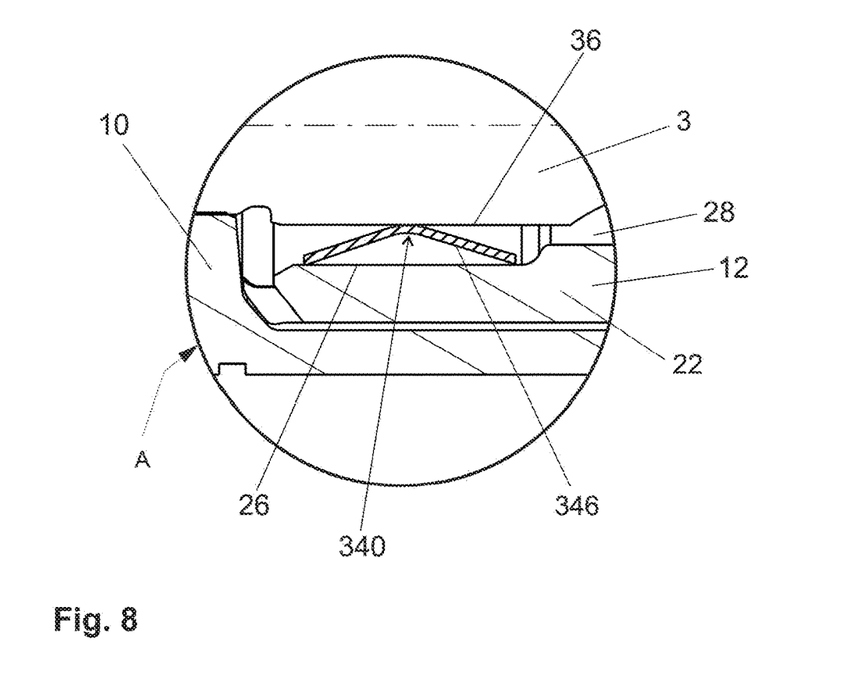
FIG. 8 is a diagrammatic sectional view of still another example bearing element taken across a bearing region.

FIG. 8 shows a diagrammatic sectional illustration of a bearing element 340 in a further embodiment. Here, the bearing element 340 is shown by way of a prestressing element which is configured in the form of a radially resilient sliding bush 346. The radially resilient sliding bush 346 is of tapered form and is accordingly capable of configuring a radial prestress.

The sliding bush 346 is supported both on the bearing seat 26 and on the bearing seat 36, with the result that the bearing element 340 transmits the prestress directly.

The bearing element 340 is accordingly configured in such a way that the prestressing element 344 radially prestresses the torsion bar 3 in the bore 28 in such a way that the torsion bar 3 is held coaxially with respect to the output shaft 12.

Figure 9:
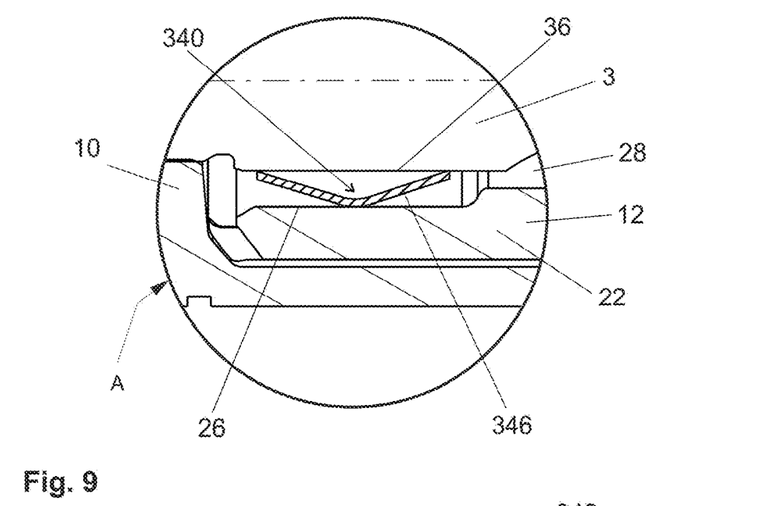
FIG. 9 is a diagrammatic sectional view of yet another bearing element taken across a bearing region.

FIG. 9 shows a further exemplary embodiment of the bearing element 340, in which once again a prestressing element is configured in the form of a radially resilient sliding bush 346 which accordingly serves as a prestressing element. The sliding bush 346 is of tapered configuration, in order for it to be possible to apply the corresponding prestressing force.

The sliding bush 346 which is shown in FIG. 9 is arranged between the bearing regions 26 and 36 in a reverse orientation to the orientation which is shown in FIG. 8.

Figure 10:
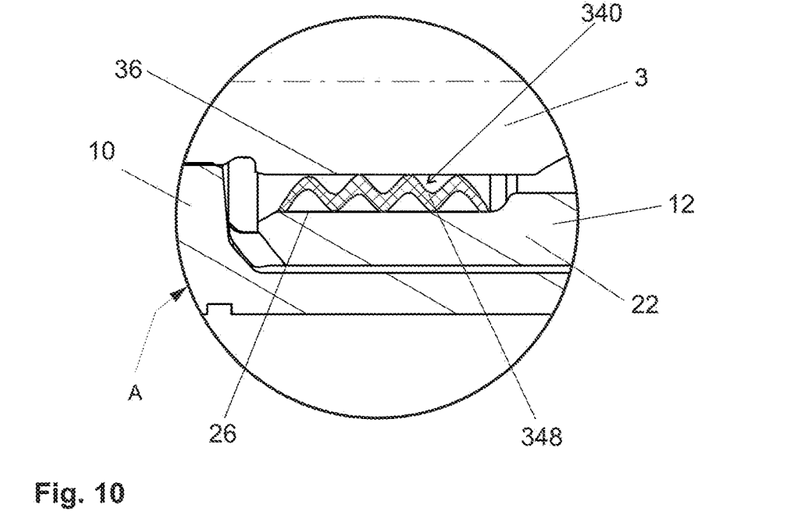
FIG. 10 is a diagrammatic sectional view of another bearing element taken across a bearing region.

FIG. 10 shows a further diagrammatic sectional illustration, in which the bearing element 340 is once again configured as a prestressing element, the bearing element 340 being configured here by way of an elastic plastic sleeve 348 which provides a prestress between the bearing seat 26 of the output shaft 12 and the bearing seat 36 of the torsion bar 3 in the radial direction. In principle, as shown, for example, in FIGS. 6, 7, 8 and 9, the prestressing elements 346, 344 might also be configured as a plastic sleeve.

FIG. 11 shows a diagrammatic perspective illustration of a steering shaft 1 in a further embodiment, which steering shaft 1 comprises an input shaft 10 and an output shaft 12, and which steering shaft 1 is provided, for example, to be used together with the torque sensor 118' from FIG. 1. Accordingly, the steering pinion 104 is provided in a manner which directly adjoins the output shaft 12, and an assistance torque is applied directly to the steering pinion 104 by means of the power assistance means 114 and/or directly to the rack 106 by means of the power assistance means 116. The steering shaft 1 which is shown in FIG. 11 has substantially the same construction internally as shown in the different embodiments in FIGS. 2 to 10.

Insofar as they can be applied, all individual features which are shown in the individual exemplary embodiments can be combined and/or replaced with one another, without departing from the scope of the invention.

What is claimed is:

1. A steering shaft for a motor vehicle steering system, the steering shaft comprising:
    a torsion bar;
    a first shaft part with a bore that receives the torsion bar, wherein the torsion bar is mounted in the bore such that the torsion bar is rotatable relative to the first shaft part via a bearing element that comprises a prestressing element, wherein the prestressing element includes a first circular portion that is adjacent and biased against one of the first shaft and the torsion bar and a second circular portion that is adjacent and biased against the other of the first shaft and the torsion bar, wherein the first and second circular portions are axially spaced apart; and
    a second shaft part rotationally-elastically coupled to the first shaft part by the torsion bar such that torque is transmitted between the first and second shaft parts.

2. The steering shaft of claim 1 wherein the prestressing element is configured to apply a radial prestressing force.

3. The steering shaft of claim 1 wherein the bearing element is configured by way of the prestressing element.

4. The steering shaft of claim 1 wherein the prestressing element comprises a sheet metal element.

5. The steering shaft of claim 1 wherein the prestressing element comprises an elastic plastic sleeve.

6. The steering shaft of claim 1 wherein the bearing element comprises a radially prestressed anti-friction bearing.

7. The steering shaft of claim 1 wherein the prestressing element comprises:
    at least one of an anti-friction bearing inner ring or an anti-friction bearing outer ring of a radially prestressed anti-friction bearing; and
    at least one rolling body.

8. The steering shaft of claim 1 wherein the prestressing element is configured by way of an elastic rolling body.

9. The steering shaft of claim 1 wherein the prestressing element is configured as a prestressed plain bearing.

10. The steering shaft of claim 1 wherein the first shaft part is connected to the second shaft part via a loose positively locking connection.

* * * * *